US012575512B2

(12) United States Patent

Bylund et al.

(10) Patent No.: US 12,575,512 B2

(45) Date of Patent: Mar. 17, 2026

(54) DEBRIS BLOWER

(71) Applicant: Husqvarna AB, Huskvarna (SE)

(72) Inventors: Christian Bylund, Huskvarna (SE); Fredrik Wibling, Malmbäck (SE); Dan Gunnarsson, Norrahammar (SE); Marcus Pettersson, Jönköping (SE); Jonas Haglind, Jönköping (SE); Klas Adolfsson, Huskvarna (SE); Joakim Linder, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 1475 days.

(21) Appl. No.: 17/050,858

(22) PCT Filed: Apr. 2, 2019

(86) PCT No.: PCT/EP2019/058281

§ 371 (c)(1),
(2) Date: Oct. 27, 2020

(87) PCT Pub. No.: WO2019/206581

PCT Pub. Date: Oct. 31, 2019

(65) Prior Publication Data

US 2021/0227758 A1 Jul. 29, 2021

(30) Foreign Application Priority Data

Apr. 27, 2018 (SE) .................................... 1850512-3

(51) Int. Cl.
*A01G 20/47* (2018.01)
*B08B 5/02* (2006.01)
(Continued)

(52) U.S. Cl.
CPC ................ *A01G 20/47* (2018.02); *B08B 5/02* (2013.01); *E01H 1/0809* (2013.01); *F04B 39/0044* (2013.01)

(58) Field of Classification Search
CPC ........ A01G 20/47; B08B 5/02; E01H 1/0809; F04B 39/0044
(Continued)

(56) References Cited

U.S. PATENT DOCUMENTS 4,692,091 A 9/1987 Ritenour
4,945,604 A 8/1990 Miner et al.
(Continued)

FOREIGN PATENT DOCUMENTS

CN 101080575 A 11/2007
CN 105934177 A 9/2016
(Continued)

OTHER PUBLICATIONS

International Search Report and Written Opinion for International Application No. PCT/EP2019/058281 mailed Jul. 4, 2019.
(Continued)

*Primary Examiner* — Katina N. Henson
(74) *Attorney, Agent, or Firm* — Burr & Forman

(57) ABSTRACT

A debris blower (1) is disclosed comprising a housing (3), a fan assembly (5) arranged in the housing (3), an outlet duct (7), and at least one isolation element (9, 9', 9", 9"') configured to reduce vibrations of the debris blower (1) during operation. The fan assembly (5) is suspended relative the outlet duct (7) completely via the at least one isolation element (9, 9', 9", 9"').

19 Claims, 3 Drawing Sheets

(51) Int. Cl.
  *E01H 1/08* (2006.01)
  *F04B 39/00* (2006.01)
(58) Field of Classification Search
  USPC .......................................................... 15/326
  See application file for complete search history.

(56) References Cited

U.S. PATENT DOCUMENTS

| | | | |
|---|---|---|---|
| 5,979,013 A | 11/1999 | Beckey et al. | |
| 6,105,206 A | 8/2000 | Tokumaru et al. | |
| 2001/0021344 A1 | 9/2001 | Miyamoto | |
| 2016/0208822 A1 | 7/2016 | Barth et al. | |
| 2016/0298635 A1* | 10/2016 | Su .......................... | F04D 29/325 |
| 2016/0305438 A1 | 10/2016 | Yamamoto et al. | |

FOREIGN PATENT DOCUMENTS

| | | | |
|---|---|---|---|
| EP | 0968644 A2 | 1/2000 | |
| JP | 2011163300 A | 8/2011 | |
| JP | 2014037817 A | 2/2014 | |
| JP | 2018523039 A | 8/2018 | |
| WO | 2016044268 A1 | 3/2016 | |
| WO | 2016188583 A1 | 12/2016 | |

OTHER PUBLICATIONS

Swedish Office Action and Search Report for Swedish Application No. 1850512-3, Mailed on Oct. 19, 2018.

\* cited by examiner

DEBRIS BLOWER

TECHNICAL FIELD

The present disclosure relates to a debris blower, such as a hand-held debris blower and a backpack debris blower.

BACKGROUND

A debris blower is a tool that propels air out of an outlet to move debris, such as leaves, grass cuttings, dust, and the like. Debris blowers comprise a fan powered by a motor, such as an electric motor or a combustion engine. Debris blowers are typically self-contained handheld units, or backpack mounted units with a handheld outlet nozzle. Debris blowers that comprise an electric motor usually comprise one or more batteries configured to power the electric motor.

The driving of the fan of a debris blower requires a lot of energy and the fan of a debris blower operates at a high power level. As a result, noise and vibration are problems associated with debris blowers.

Electrically powered debris blowers, i.e. debris blowers comprising a fan powered by an electric motor, generally generate less noise and less vibration than debris blowers comprising a fan powered by a combustion engine. However, also electrically powered debris blowers generate unwanted levels of noise and vibration, and noise and vibration are also problems associated with electrically powered debris blowers.

Further, on today's market, it is an advantage if products, such as debris blowers, can be provided in a cost-efficient manner.

SUMMARY

It is an object of the present invention to overcome, or at least alleviate, at least some of the above-mentioned problems and drawbacks.

According to an aspect of the invention, the object is achieved by a debris blower comprising a housing, a fan assembly arranged in the housing, an outlet duct, and at least one isolation element configured to reduce vibrations of the debris blower during operation. The fan assembly is suspended relative the outlet duct completely via the at least one isolation element.

Since the fan assembly is suspended relative the outlet duct completely via the at least one isolation element, a debris blower is provided generating less noise during operation. This because only a fraction of the noise and vibration generated by the fan assembly will be transferred to the outlet duct during operation of the debris blower.

In addition, since the fan assembly is suspended relative the outlet duct completely via the at least one isolation element, a debris blower is provided which may generate less vibration, and a lower amount of vibration may be transferred to a person using the debris blower.

Accordingly, a debris blower is provided overcoming, or at least alleviating, at least some of the above-mentioned problems and drawbacks. As a result, the above-mentioned object is achieved.

Optionally, the fan assembly is suspended relative the housing completely via the at least one isolation element. Thereby, a debris blower is provided generating even less noise during operation. This because only a fraction of noise and vibration generated by the fan assembly will be transferred to the housing during operation of the debris blower.

In addition, a debris blower is provided which may generate even less vibration, and an even lower amount of vibration may be transferred to a person using the debris blower.

Optionally, the outlet duct is rigidly attached to the housing. Thereby, a robust debris blower is provided capable of generating less noise and vibration during operation.

Optionally, the fan assembly comprises a fan duct and a fan arranged in the fan duct, and wherein the at least one isolation element comprises at least one fan outlet isolation element extending between the fan duct and the outlet duct. Thereby, a debris blower is provided which in a simple and efficient manner generates less noise and vibration during operation. As a further result, a debris blower is provided having conditions and characteristics suitable for being manufactured and assembled in a simple and cost-efficient manner.

Optionally, an inner surface of the at least one fan outlet isolation element delimits a portion of an air flow path through the debris blower. Thereby, a debris blower is provided generating even less noise and vibration during operation. This because the at least one fan outlet isolation element will at least partially attenuate sound and vibration originating from the turbulent airflow in the air flow path, as well as sound and vibration originating from the fan.

Further, a debris blower is provided having conditions and characteristics suitable for being manufactured and assembled in a simple and cost-efficient manner.

Optionally, the inner surface of the at least one fan outlet isolation element is flush with an inner surface of the fan duct at a transition area from the inner surface of the fan duct to the inner surface of the at least one fan outlet isolation element. Thereby, the flow resistance through the air flow path is kept low, which potentially can reduce the energy consumption of the fan assembly. Further, sound and vibration originating from a turbulent airflow in the air flow path may be reduced.

Optionally, the debris blower comprises an inlet duct, and wherein the fan assembly is suspended relative the inlet duct completely via the at least one isolation element. Thereby, a debris blower is provided generating even less noise and vibration during operation. This because only a fraction of the noise and vibration generated by the fan assembly will be transferred to the inlet duct during operation of the debris blower.

Optionally, the inlet duct is rigidly attached to the housing. Thereby, a robust debris blower is provided capable of generating less noise and vibration during operation.

Optionally, the fan assembly comprises a fan duct and a fan arranged in the fan duct, and wherein the at least one isolation element comprises at least one fan inlet isolation element extending between the inlet duct and the fan duct. Thereby, a debris blower is provided which in a simple and efficient manner generates less noise and vibration during operation. As a further result, a debris blower is provided having conditions and characteristics suitable for being manufactured and assembled in a simple and cost-efficient manner.

Optionally, an inner surface of the at least one fan inlet isolation element delimits a portion of an air flow path through the debris blower. Thereby, a debris blower is provided generating even less noise and vibration during operation. This because the at least one fan inlet isolation element will at least partially attenuate sound and vibration originating from a turbulent airflow in the air flow path, as well as sound and vibration originating from the fan. Further, a debris blower is provided having conditions and characteristics suitable for being manufactured and assembled in a simple and cost-efficient manner.

Optionally, the inner surface of the at least one fan inlet isolation element is flush with an inner surface of the fan duct at a transition area from the inner surface of the at least one fan inlet isolation element to the inner surface of the fan duct. Thereby, the flow resistance through the air flow path is kept low, which potentially can reduce the energy consumption of the fan assembly. Further, sound and vibration originating from a turbulent airflow in the air flow path may be reduced.

Optionally, the at least one isolation element comprises a circumferential isolation element surrounding at least a portion of the circumference of the fan assembly. Thereby, a debris blower is provided generating even less noise and vibration during operation. This because the circumferential isolation element will at least partially attenuate noise and vibration generated by the fan assembly. As a further result thereof, less vibration may be transferred to a person using the debris blower.

Optionally, at least a portion of the at least one fan outlet isolation element, the at least one fan inlet isolation element, and/or the circumferential isolation element is/are press fit between the housing and the fan assembly. Thereby, a robust debris blower is provided capable of attenuating noise and vibration in a simple and efficient manner. Further, a debris blower is provided having conditions and characteristics suitable for being manufactured and assembled in a simple and cost-efficient manner.

Optionally, the debris blower comprises one or more continuous pieces of isolation material each comprising at least a section of the circumferential isolation element, at least a section of the fan outlet isolation element, and at least a section of the fan inlet isolation element. Thereby, a debris blower is provided capable of generating even less noise and vibration during operation. This because the isolation elements may together cover a great area of the components of the debris blower. Further, a debris blower is provided having conditions and characteristics suitable for being manufactured and assembled in a simple and cost-efficient manner.

Optionally, the at least one isolation element comprises an outlet duct cladding covering inner surfaces of the outlet duct. Thereby, a debris blower is provided generating even less noise and vibration during operation. This because the outlet duct cladding will at least partially attenuate sound and vibration originating from a turbulent airflow in the outlet duct, as well as sound and vibration originating from the fan. As a further result, less vibration will be transferred to outer surfaces of the outlet duct, which may further reduce the amount of noise and vibration generated by the debris blower. In addition, a debris blower is provided having conditions and characteristics suitable for being manufactured and assembled in a simple and cost-efficient manner.

Optionally, the debris blower comprises one or more continuous pieces of isolation material each comprising at least a section of the fan outlet isolation element and at least a section of the outlet duct cladding. Thereby, a debris blower is provided capable of generating even less noise and vibration during operation. This because the isolation elements may together cover a great area of the components of the debris blower. Further, a debris blower is provided having conditions and characteristics suitable for being manufactured and assembled in a simple and cost-efficient manner.

Optionally, the debris blower comprises one or more continuous pieces of isolation material each comprising at least a section of the fan outlet isolation element, at least a section of fan inlet isolation element, at least a section of the circumferential isolation element, and at least a section of the outlet duct cladding. Thereby, a debris blower is provided capable of generating even less noise and vibration during operation. This because the isolation elements may together cover a great area of the components of the debris blower. Further, a debris blower is provided having conditions and characteristics suitable for being manufactured and assembled in a simple and cost-efficient manner.

Optionally, the one or more continuous pieces of isolation material together form a tubular structure, wherein an inner surface of the tubular structure comprises a first recess, and wherein the fan assembly is form-fittingly held in the first recess. Thereby, a debris blower is provided capable of generating even less noise and vibration during operation. This because the tubular structure will cover substantially the entire circumference of the fan assembly. Accordingly, less noise and vibration will be transferred to the housing. As a further result, less vibration may be transferred to a person using the debris blower. In addition, a debris blower is provided having conditions and characteristics suitable for being manufactured and assembled in a simple and cost-efficient manner.

Optionally, the one or more continuous pieces of isolation material together form a tubular structure, wherein an inner surface of the tubular structure comprises a second recess, and wherein at least a portion of the inlet duct is form-fittingly held in the second recess. Thereby, a debris blower is provided capable of generating even less noise and vibration during operation. This because the tubular structure will cover substantially the entire circumference of the inlet duct. Accordingly, less noise and vibration will be transferred to the inlet duct. As a further result, less vibration may also be transferred to a person using the debris blower. In addition, a debris blower is provided having conditions and characteristics suitable for being manufactured and assembled in a simple and cost-efficient manner.

Optionally, the one or more continuous pieces of isolation material together form a tubular structure, wherein an inner surface of the tubular structure comprises a third recess, and wherein at least a portion of the outlet duct is form-fittingly held in the third recess. Thereby, a debris blower is provided capable of generating even less noise and vibration during operation. This because the tubular structure will cover substantially the entire circumference of the outlet duct. Accordingly, less noise and vibration will be transferred to the outlet duct. As a further result, less vibration may also be transferred to a person using the debris blower. Further, a debris blower is provided having conditions and characteristics suitable for being manufactured and assembled in a simple and cost-efficient manner.

Optionally, the at least one isolation element comprises foam rubber. Thereby, the noise and vibration generated by the debris blower are reduced in an efficient manner. Accordingly, a debris blower is provided capable of generating even less noise and vibration during operation. As a further result, even less vibration may be transferred to a person using the debris blower. Further, a debris blower is provided having conditions and characteristics suitable for being manufactured and assembled in a simple and cost-efficient manner.

Optionally, a thickness of the foam rubber is within the range of 7 mm to 50 mm, such as within the range of 10 mm to 35 mm. Thereby, the noise and vibration generated by the debris blower are reduced in an efficient manner. Accordingly, a debris blower is provided capable of generating even less noise and vibration during operation. As a further result, even less vibration may be transferred to a person using the debris blower.

Optionally, the fan assembly is an axial fan assembly. Thereby, a simple and efficient debris blower is provided capable of generating a low amount of noise and vibration during operation. Further, a debris blower is provided having conditions and characteristics suitable for being manufactured and assembled in a simple and cost-efficient manner.

Optionally, the fan assembly comprises a fan and an electric motor configured to rotate the fan. Thereby, an environmentally-friendly debris blower is provided capable of generating a low amount of noise and vibration during operation.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
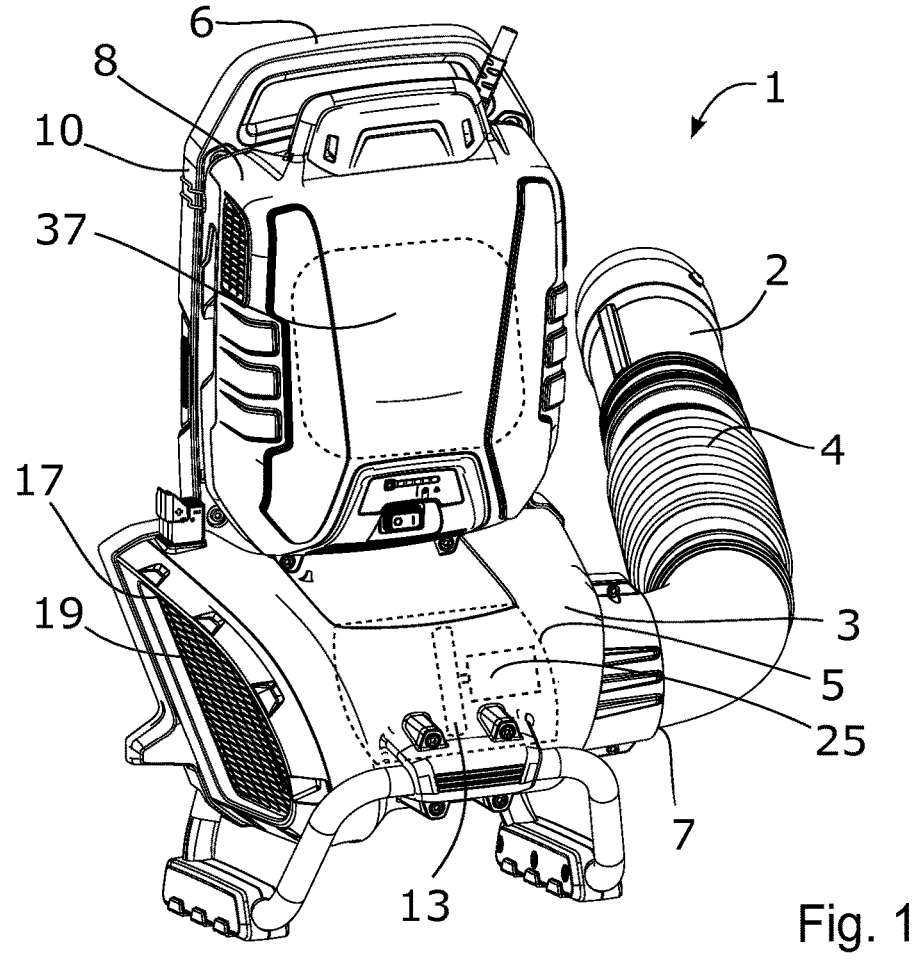
FIG. 1 illustrates a debris blower according to some embodiments.

FIG. 1 illustrates a debris blower 1 according to some embodiments. The debris blower 1 comprises a housing 3 and an inlet duct 17 and an outlet duct 7 connected to the housing 3. The debris blower 1 further comprises a fan assembly 5 arranged in the housing 3. The fan assembly 5 comprises a fan 13 and motor 25 configured to rotate the fan 13 to generate a flow of air from the inlet duct 17 to the outlet duct 7. According to the illustrated embodiments, the debris blower 1 comprises an outlet nozzle 2 connected to the outlet duct 7. The outlet nozzle 2 is provided with a flexible bellow portion 4. Further, according to the illustrated embodiments, the debris blower 1 comprises a handle portion 6 at an upper portion of the debris blower 1. The handle portion 6 facilitates transport of the debris blower 1, when the debris blower 1 is not in use. According to the illustrated embodiments, the motor 25 is an electric motor. The debris blower 1 comprises a second housing 8 accommodating a battery 37, and a frame 10 supporting the housing 3 and the second housing 8. The battery 37 is a rechargeable battery configured to power the electric motor 25 during operation of the debris blower 1. According to the illustrated embodiments, the debris blower 1 is a backpack mounted debris blower and may thus be referred to as a backpack debris blower for garden maintenance. The debris blower 1 comprises shoulder straps connected to the frame 10. The shoulder straps are not visible in FIG. 1. The shoulder straps allow a user to carry the debris blower 1 on the back of the user. That is, during use of the debris blower 1 according to the illustrated embodiments, the frame 10 supporting the housing 3 and the second housing 8 can rest on the back of the user, and the user may grab the outlet nozzle 2 with a hand to direct the air flowing from the outlet nozzle 2 to move debris such as leaves, grass cuttings, dust, and the like.

The debris blower 1 further comprises an air inlet screen 19 arranged at the inlet duct 17. The air inlet screen 19 is arranged to hinder objects greater than a certain size to enter the inlet duct 17. According to further embodiments of the present disclosure, the debris blower 1, as referred to herein, may be a portable hand-held debris blower for garden maintenance. In addition, according to some embodiments of the present disclosure, the motor 25 may be a combustion engine configured to rotate the fan 13 to generate a flow of air from the inlet duct 17 to the outlet duct 7. According to such embodiments, the debris blower 1 comprises a fuel tank instead of the battery 37.

Figure 2:
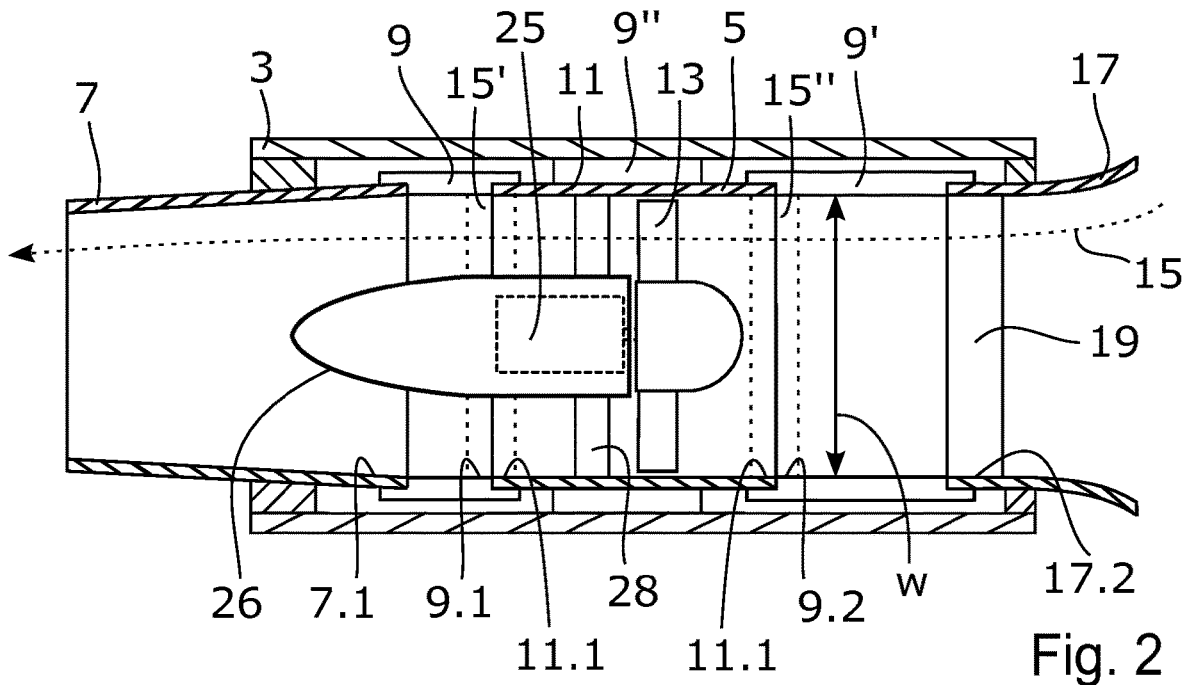
FIG. 2 schematically illustrates a cross section through a housing of the debris blower, illustrated in FIG. 1, FIG. 3 schematically illustrates a cross section through a housing of a debris blower according to some further embodiments.

FIG. 2 schematically illustrates a cross section through the housing 3 of the debris blower 1, illustrated in FIG. 1. The debris blower comprises a set of isolation elements 9, 9', 9" configured to reduce vibrations of the debris blower during operation. According to the illustrated embodiments, the fan assembly 5 is suspended relative the housing 3 completely via the set of isolation elements 9, 9', 9", 9'". As a result thereof, the fan assembly 5 is suspended relative the outlet duct 7 completely via the set of isolation elements 9, 9', 9".

According to the embodiments illustrated in FIG. 2, the outlet duct 7 is rigidly attached to the housing 3. The fan assembly 5 comprises a fan duct 11 and a fan 13 arranged in the fan duct 11. Further, the fan assembly 5 comprises the electric motor 25 which is configured to rotate the fan 13. According to the illustrated embodiments, the fan assembly 5 is an axial fan assembly 5 and the fan duct 11 is substantially tubular. The electric motor 25 and the fan 13 are arranged such that a rotation axis of the electric motor 25 and a rotation axis of the fan 13 each is coaxial to a centre line of the substantially tubular fan duct 11. During operation, the electric motor 25 rotates the fan 13 to generate a flow of air through an air flow path 15 through the debris blower. The air flow path 15 extends from an inlet of the inlet duct 17, through the fan duct 11, and to an outlet of the outlet duct 7. The electric motor 25 is arranged in an aerodynamically shaped casing 26 which is held concentrically in the fan duct 11 by one or more holding members 28 extending between an inner surface 11.1 of the fan duct 11 and the casing 26. The electric motor 25 may be press-fit into an axial centre of the casing 26 and may be locked therein with screws. Radial/axial flanges of the casing 26 may hold the motor at a distance from an inner mantle of the casing 26, to allow cooling air to flow in a space between the casing 26 and the electric motor 25. The one or more holding members 28 are arranged downstream of the fan 13. The one or more holding members 28 may each be provided with an angle relative an air flow direction through the air flow path 15, and/or may each comprise a wing-profile in the air flow direction through the air flow path 15, so as to direct the air flow generated by the fan 13 in a laminar, axial direction.

Purely as an example, the debris blower may comprise a number of holding members 28 within the range of 1-10, such as within the range of 4-8.

The set of isolation elements 9, 9', 9" comprises a fan outlet isolation element 9 extending between the fan duct 11 and the outlet duct 7. According to the illustrated embodiments, the fan outlet isolation element 9 covers the entire outer circumference of a portion of the outlet duct 7 and covers the entire outer circumference of a portion of the fan duct 11. In this manner, the fan outlet isolation element 9 attenuates noise and vibration generated by the fan assembly 5, and attenuates noise and vibration generated by the flow of air through the air flow path 15, as well as provides support of the fan assembly 5 relative the outlet duct 7 and thus also provides support of the fan assembly 5 relative the housing 3.

According to the illustrated embodiments, an inner surface 9.1 of the fan outlet isolation element 9 delimits a portion of the air flow path 15 through the debris blower. Thereby, noise and vibration generated by the flow of air through an air flow path 15 is attenuated in an efficient manner. According to the illustrated embodiments, the fan outlet isolation element 9 extends around the entire circumference of the portion of the air flow path 15 formed by the fan outlet isolation element 9. Further, as indicated in FIG. 2, the inner surface 9.1 of the fan outlet isolation element 9 is flush with an inner surface 11.1 of the fan duct 11 at a transition area 15' from the inner surface 11.1 of the fan duct 11 to the inner surface 9.1 of the fan outlet isolation element 9. In this manner, the transition area 15' will not disturb the flow of air through the air flow path 15. In addition, according to the illustrated embodiments, the inner surface 9.1 of the fan outlet isolation element 9 is flush with an inner surface 7.1 of the outlet duct 7 at a transition area from the inner surface 9.1 of the fan outlet isolation element 9 to the inner surface 7.1 of the outlet duct 7. In this manner, also this transition area will not cause disturbance to the flow of air through the air flow path 15.

According to the illustrated embodiments, the inlet duct 17 is rigidly attached to the housing 3. However, the fan assembly 5 is suspended relative the inlet duct 17 completely via the set of isolation elements 9, 9', 9". According to the illustrated embodiments, the set of isolation elements 9, 9', 9" comprises a fan inlet isolation element 9' extending between the inlet duct 17 and the fan duct 11. Further, according to the illustrated embodiments, the fan inlet isolation element 9' covers the entire outer circumference of a portion of the inlet duct 17 and covers the entire outer circumference of a portion of the fan duct 11. In this manner, the fan inlet isolation element 9' attenuates noise and vibration generated by the fan assembly 5, and attenuates noise and vibration generated by the flow of air through the air flow path 15, as well as provides support of the fan assembly 5 relative the inlet duct 17 and thus also relative the housing 3.

According to the illustrated embodiments, an inner surface 9.2 of the fan inlet isolation element 9' delimits a portion of an air flow path 15 through the debris blower. Thereby, noise and vibration generated by the flow of air through an air flow path 15 is attenuated in an efficient manner. Further, according to the illustrated embodiments, the fan inlet isolation element 9' extends around the entire circumference of the portion of the air flow path 15 formed by the fan inlet isolation element 9'. The inlet duct 17 comprises the air inlet screen 19. Further, as indicated in FIG. 2, the inner surface 9.2 of the fan inlet isolation element 9' is flush with an inner surface 11.1 of the fan duct 11 at a transition area 15" from the inner surface 9.2 of the fan inlet isolation element 9' to the inner surface 11.1 of the fan duct 11. In this manner, the transition area 15' will not disturb the flow of air through the air flow path 15. In addition, according to the illustrated embodiments, the inner surface 9.2 of the fan inlet isolation element 9' is flush with an inner surface 17.2 of the inlet duct 17 at a transition area from the inner surface 17.2 of the inlet duct 17 to the inner surface 9.2 of the fan inlet isolation element 9'. In this manner, also this transition area will not cause disturbance to the flow of air through the air flow path 15.

According to the illustrated embodiments, the portion of the air flow path 15 formed by the fan inlet isolation element 9' has substantially the same width w as the width of the fan duct 11, wherein the width w is measured in a direction perpendicular to an air flow direction through the air flow path 15. Likewise, according to the illustrated embodiments, the portion of the air flow path 15 formed by the fan outlet isolation element 9 has substantially the same width as the width of the fan duct 11. Thereby, the fan 13 can pump air through the air flow path 15 in an efficient manner, and the flow resistance through the air flow path 15 is kept low. In addition, noise and vibration originating from a turbulent airflow in the air flow path 15 can be kept low.

According to some further embodiments, the portion of the air flow path 15 formed by the fan inlet isolation element 9' has a greater width w than the fan duct 11. Furthermore, the inlet duct 17 may have a greater width w than the fan duct 11. However, also in these embodiments, the inner surface 9.2 of the fan inlet isolation element 9' may be flush with an inner surface 11.1 of the fan duct 11 at the transition area 15" from the inner surface 9.2 of the fan inlet isolation element 9' to the inner surface 11.1 of the fan duct 11. Likewise, the inner surface 9.2 of the fan inlet isolation element 9' may be flush with the inner surface 17.2 of the inlet duct 17 at the transition area from the inner surface 17.2 of the inlet duct 17 to the inner surface 9.2 of the fan inlet isolation element 9'. Due to these features, the flow resistance through the air flow path 15 can be further lowered.

According to the illustrated embodiments, the set of isolation elements 9, 9', 9" comprises a circumferential isolation element 9" surrounding at least a portion of the circumference of the fan assembly 5, i.e. surrounding at least a portion of the circumference of the fan duct 11 of the fan assembly 5. In this manner, noise and vibration generated by the fan assembly 5 is further attenuated. According to the illustrated embodiments, the circumferential isolation element 9" surrounds substantially the entire portion of the circumference of the fan assembly 5, i.e. surrounds substantially the entire portion of the circumference of the fan duct 11 of the fan assembly 5.

According to the embodiments illustrated in FIG. 2, the circumferential isolation element 9" is press fit between the housing 3 and the fan duct 11 of the fan assembly 5. In this manner, the circumferential isolation element 9" supports the fan assembly in the housing 3 and a robust debris blower is provided, while noise and vibration generated by the fan assembly 5 is attenuated in an efficient manner.

Figure 3:
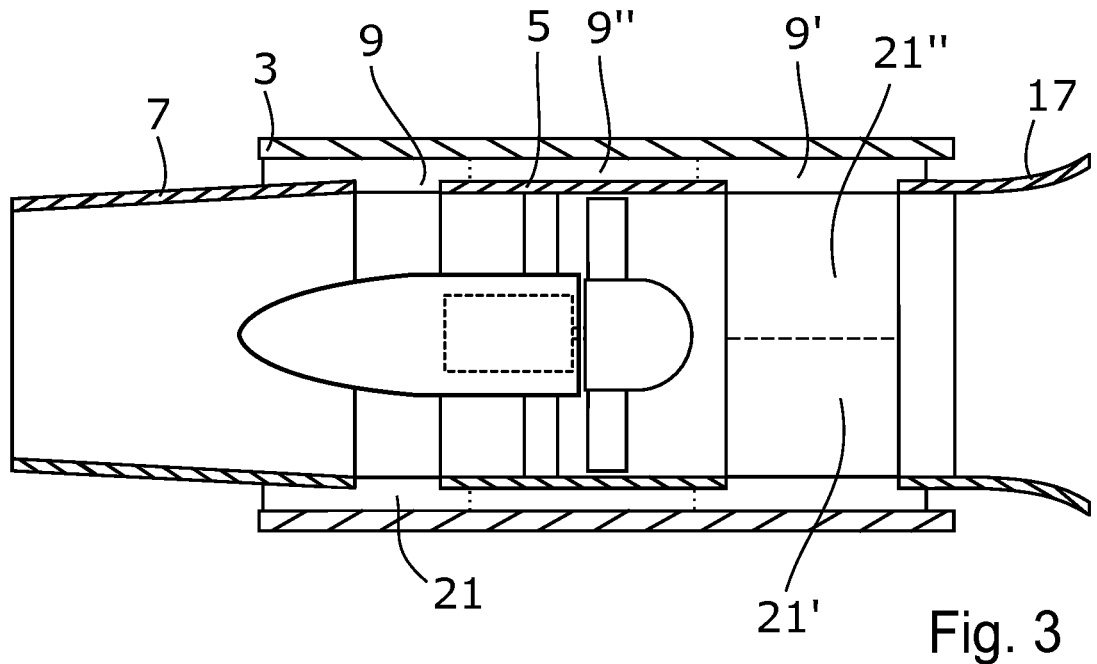

FIG. 3 schematically illustrates a cross section through a housing 3 of a debris blower according to some further embodiments. The debris blower according to these embodiments comprises the same components, features, and advantages as the debris blower 1 explained with reference to FIG. 1 and FIG. 2, with some exceptions explained below.

According to the embodiments illustrated in FIG. 3, the outlet duct 7 is not rigidly attached to the housing 3. Instead, a portion of the fan outlet isolation element 9 is press fit between the housing 3 and the outlet duct 7. In this manner, the outlet duct 7 is held in place relative the housing 3 by the fan outlet isolation element 9. Thereby, even less noise and vibration may be transferred from the fan assembly 5 to the outlet duct 7. Likewise, according to the embodiments illustrated in FIG. 3, the inlet duct 17 is not rigidly attached to the housing 3.

Instead, a portion of the fan inlet isolation element 9' is press fit between the housing 3 and the inlet duct 17. In this manner, the inlet duct 17 is held in place relative the housing 3 by the fan inlet isolation element 9'. Thereby, even less noise and vibration may be transferred from the fan assembly 5 to the inlet duct 17.

Furthermore, according to the embodiments illustrated in FIG. 3, the debris blower comprises two continuous pieces 21', 21" of isolation material each comprising a respective section of the circumferential isolation element 9", a respective section of the fan outlet isolation element 9, and a respective section of the fan inlet isolation element 9'. That is, according to the illustrated embodiments, a first section of the circumferential isolation element 9", a first section of the fan outlet isolation element 9, and a first section of the fan inlet isolation element 9' are integrally formed in a first continuous piece 21' of isolation material. Furthermore, a second section of the circumferential isolation element 9", a second section of the fan outlet isolation element 9, and a second section of the fan inlet isolation element 9' are integrally formed in a second continuous piece 21" of isolation material. According to the illustrated embodiments, the first and second sections of the isolation elements 9, 9', 9" constitutes a first and a second half of the respective isolation element 9, 9', 9". The two continuous pieces 21', 21" of isolation material together form a tubular structure 21. According to further embodiments, one or more of these isolation elements 9, 9', 9" may be a separate isolation element 9, 9', 9".

Figure 4:
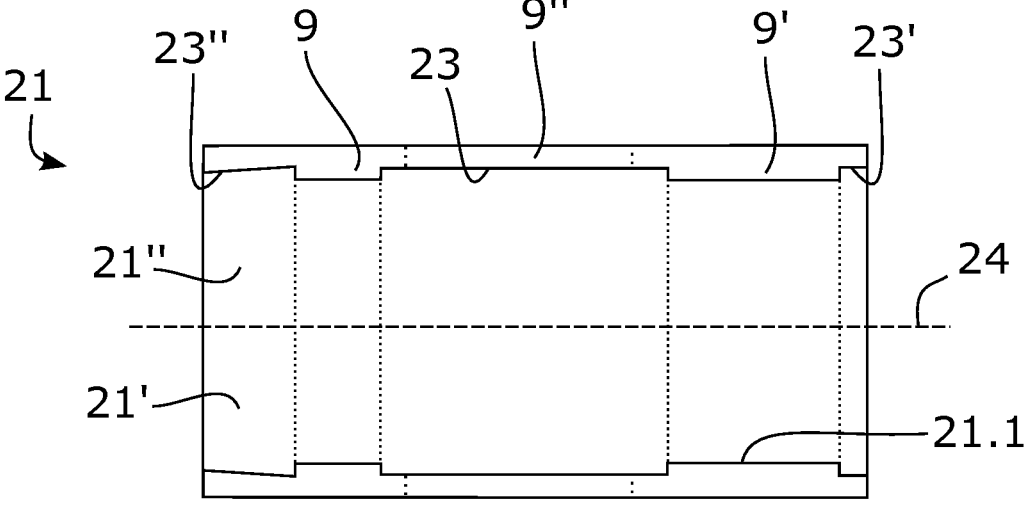
FIG. 4 illustrates a cross section of a tubular structure of the debris blower according to the embodiments illustrated in FIG. 3, FIG. 5 schematically illustrates a cross section through a housing of a debris blower according to some further embodiments.

FIG. 4 illustrates a cross section of the tubular structure 21 of the debris blower according to the embodiments illustrated in FIG. 3. Below, simultaneous reference is made to FIG. 3 and to FIG. 4. An inner surface 21.1 of the tubular structure 21 comprises a first recess 23. The fan assembly 5, illustrated in FIG. 3, is form-fittingly held in the first recess 23, illustrated in FIG. 4.

Further, according to the embodiments illustrated in FIG. 4, the inner surface 21.1 of the tubular structure 21 comprises a second recess 23'. A portion of the inlet duct 17, illustrated in FIG. 3, is form-fittingly held in the second recess 23', illustrated in FIG. 4.

Further, according to the embodiments illustrated in FIG. 4, the tubular structure 21 comprises a third recess 23". A portion of the outlet duct 7, illustrated in FIG. 3, is form-fittingly held in the third recess 23", illustrated in FIG. 4.

In this manner, fan assembly 5, the inlet duct 17, and the outlet duct 7 are held in place relative the housing 3 in a simple and efficient manner, while noise and vibrations caused by the fan assembly 5, and by the flow of air through the airflow path through the debris blower, is attenuated in an efficient manner. Furthermore, due to these features, a debris blower is provided which can be assembled in a simple and cost-efficient manner, as is further explained below.

The tubular structure 21 may be formed by assembling and/or joining two or more continuous pieces 21', 21" of isolation material in an assembling process of the debris blower. According to the illustrated embodiments, the tubular structure 21 comprises a first piece 21' of isolation material and a second piece 21" of isolation material.

Furthermore, the first and second continuous pieces 21', 21" of isolation material are arranged to be attached to each other along a separation plane 24 extending along an airflow direction in the air flow path through the debris blower, to thereby together form the tubular structure 21. According to the illustrated embodiments, the separation plane 24 extends along a centre line of the air flow path through the debris blower, which may further facilitate assembling of the debris blower. Further, the housing 3 may comprise two or more housing parts.

In an assembling process of the debris blower, the first piece 21' of isolation material may be positioned in a first housing part. Then, the fan assembly 5 may be positioned in the first recess 23 of the first piece 21' of isolation material, the portion of the inlet duct 17 may be positioned in the second recess 23' of the first piece 21' of isolation material, and the portion of the outlet duct 7 may be positioned in the third recess 23" of the first piece 21' of isolation material. Then, the second piece 21" of isolation material may be positioned onto these components. In this assembling step, an assembler may ensure that electrical wiring to the motor of the fan assembly 5 extends through an interface between the first and second continuous pieces 21', 21" of isolation material. The first and second continuous pieces 21', 21" of isolation material may for example be joined to each other along the separation plane 24 using glue. Then, a second housing part may be attached to the first housing part. According to some embodiments, the continuous pieces 21', 21" of isolation material forming the tubular structure 21 may not be joined to each other, but instead assembled relative each other, and may be held relative each other, by the housing 3.

By assembling the debris blower using at least some of the above described assembling steps, the debris blower can be assembled in a simple and cost-efficient manner.

Figure 5:
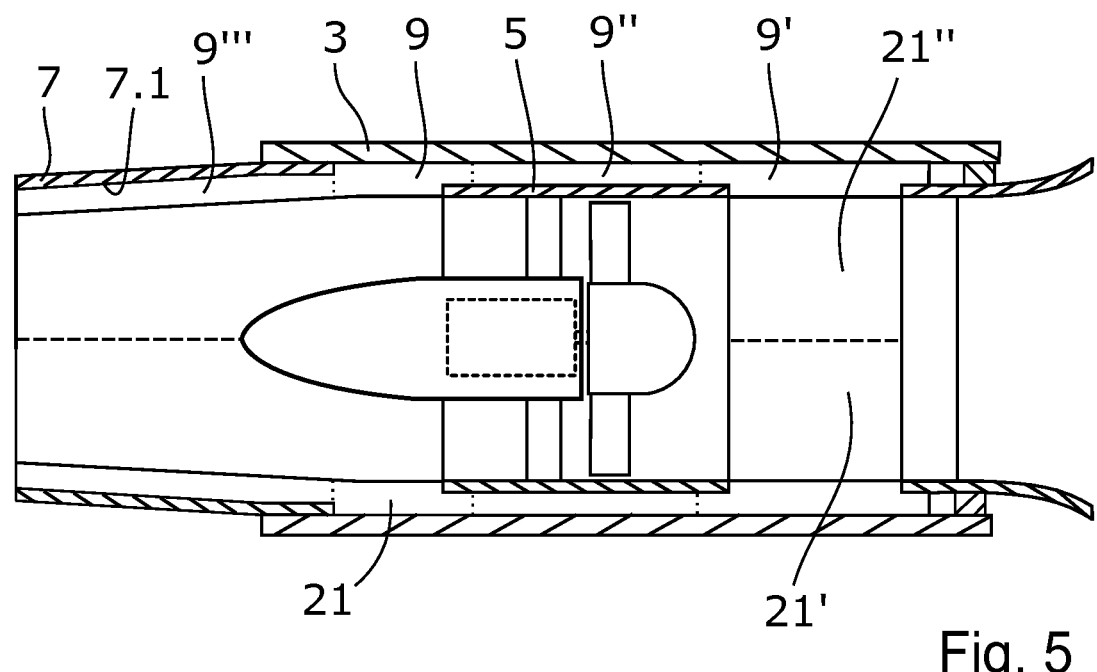

FIG. 5 schematically illustrates a cross section through a housing 3 of a debris blower according to some further embodiments. According to these embodiments, the outlet duct 7 and the inlet duct 17 are each rigidly attached to the housing 3. The debris blower according to these embodiments comprises the same components, features, and advantages as the debris blower 1 explained with reference to FIG. 1 and FIG. 2, with some exceptions explained below.

According to the embodiments illustrated in FIG. 5, the set of isolation elements 9, 9', 9", 9'" comprises an outlet duct cladding 9" covering inner surfaces 7.1 of the outlet duct 7. Further, according the embodiments illustrated in FIG. 5, the debris blower comprises two continuous pieces 21', 21" of isolation material each comprising a respective section of the fan outlet isolation element 9, a respective section of fan inlet isolation element 9', a respective section of the circumferential isolation element 9", and a respective section of the outlet duct cladding 9". The two continuous pieces 21', 21" of isolation material together form a tubular structure 21. According to further embodiments, one or more of these isolation elements 9, 9', 9", 9'" may be a separate isolation element 9, 9', 9", 9'". According to still further embodiments, the debris blower may comprise one or more continuous pieces 21', 21" of isolation material each comprising a respective section of the fan outlet isolation element 9 and a respective section of the outlet duct cladding 9". Such one or more continuous pieces 21', 21" of isolation material may together form a tubular structure. Further, the debris blower may comprise one or more continuous pieces 21', 21" of isolation material each comprising a respective section of the circumferential isolation element 9", a respective section of the fan outlet isolation element 9 and a respective section of the outlet duct cladding 9". Such one or more continuous pieces 21', 21" of isolation material may together form a tubular structure. According to the embodiments illustrated in FIG. 5, the circumferential isolation element 9" is press fit between the housing 3 and the fan assembly 5.

Figure 6:
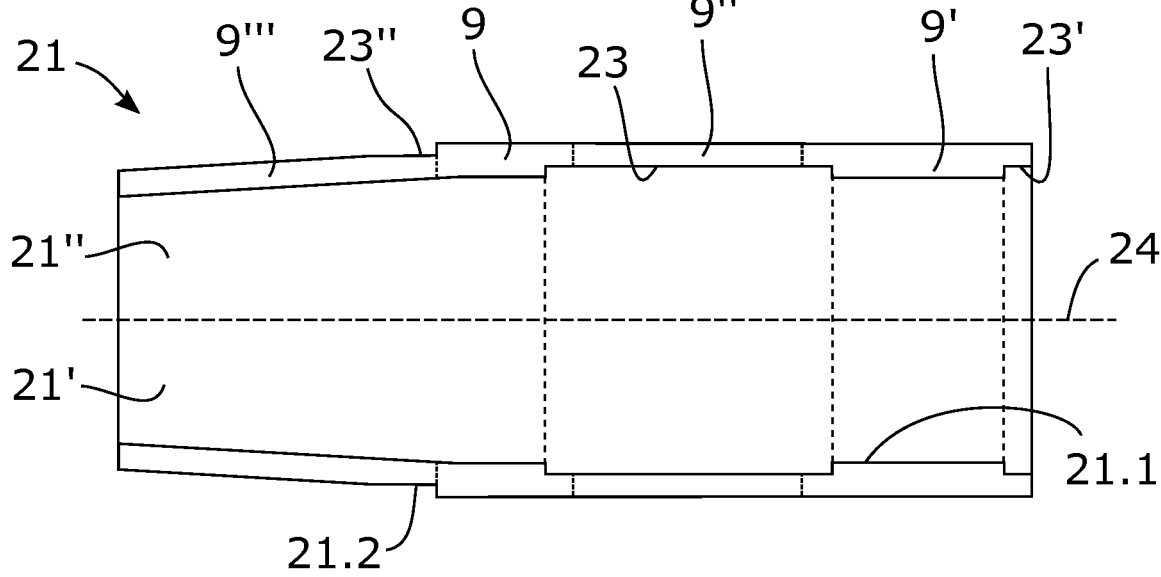
FIG. 6 illustrates a cross section of the tubular structure of the debris blower according to the embodiments illustrated in FIG. 5.

FIG. 6 illustrates a cross section of the tubular structure 21 of the debris blower according to the embodiments illustrated in FIG. 5. Below, simultaneous reference is made to FIG. 5 and to FIG. 6. An inner surface 21.1 of the tubular structure 21 comprises a first recess 23, wherein the fan assembly 5 is form-fittingly held in the first recess 23.

Further, according to the embodiments illustrated in FIG. 6, the inner surface 21.1 of the tubular structure 21 comprises a second recess 23'. A portion of the inlet duct 17 is form-fittingly held in the second recess 23'.

Further, according to the embodiments illustrated in FIG. 6, an outer surface 21.2 of the tubular structure 21 comprises a third recess 23". The outlet duct 7 is arranged the third recess 23" and may be form-fittingly held in the third recess 23".

According to the embodiments illustrated in FIG. 5 and FIG. 6, the tubular structure 21 comprises a first piece 21' of isolation material and a second piece 21" of isolation material. According to the illustrated embodiments, the first and second continuous pieces 21', 21" of isolation material are arranged to be attached to each other along a separation plane 24 extending along an airflow direction in the air flow path through the debris blower, to thereby together form the tubular structure 21. Further, the housing 3 may comprise two or more housing parts. According to the illustrated embodiments, the separation plane 24 extends along a centre line of the air flow path through the debris blower, which may further facilitate assembling of the debris blower.

In an assembling process of the debris blower, the first piece 21' of isolation material may be positioned in a first housing part. Then, the fan assembly 5 may be positioned in the first recess 23 of the first piece 21' of isolation material, the portion of the inlet duct 17 may be positioned in the second recess 23' of the first piece 21' of isolation material. Then, the second piece 21" of isolation material may be positioned onto these components. In this assembling step, an assembler may ensure that electrical wiring to the motor of the fan assembly 5 extends through an interface between the first and second continuous pieces 21', 21" of isolation material. The first and second continuous pieces 21', 21" of isolation material may for example be joined to each other along the separation plane 24 using glue. Then, the outlet duct 7 may be positioned in the third recess 23" of the tubular structure 21. Then, a second housing part may be attached to the first housing part, and the housing 3 may be fastened to the outlet duct 7, for example using glue or fastening elements, such as screws. According to some embodiments, the continuous pieces 21', 21" of isolation material forming the tubular structure 21 may not be joined to each other, but instead assembled relative each other, and may be held relative each other, by the housing 3, and by the outlet duct 7.

By assembling the debris blower using at least some of the above described assembling steps, the debris blower can be assembled in a simple and cost-efficient manner.

According to all embodiments of the present disclosure, the isolation elements 9, 9', 9", 9'" may comprises foam rubber, such as polyurethane foam. Thus, two or more of the isolation elements 9, 9', 9", 9'" may be comprised in one or more continuous pieces 21', 21" of foam rubber, such as polyurethane foam. Accordingly, such one or more continuous pieces 21', 21" of foam rubber may together form a tubular structure 21 of foam rubber, such as polyurethane foam.

Further, according to all embodiments of the present disclosure, a thickness of the foam rubber may be within the range of 7 mm to 50 mm, such as within the range of 10 mm to 35 mm. The thickness of the foam rubber may be measured in a direction perpendicular to a flow direction of the flow path through the debris blower.

Further, according to some embodiments of the present disclosure, the fan duct 11 comprises one or more protrusions extending in a radial direction fan duct 11. Such one or more protrusions may radially, tangentially, and/or axially lock the fan duct 11 to the circumferential isolation element 9" in a form-fitting manner.

Further, according to some embodiments of the present disclosure, one or more of the outlet duct 7, the fan duct 11 and the inlet duct 17 is/are tubular. Therefore, throughout this disclosure, the wording "outlet duct" may be replaced by the wording "outlet tube", the wording "inlet duct" may be replaced by the wording "inlet tube", and the wording "fan duct" may be replaced by the "wording fan tube". Furthermore, throughout this disclosure, the wording "fan duct" may be replaced by the wording "stator" or "fan stator". According to some embodiments, the housing 3, as referred to herein may be replaced by a frame. Therefore, throughout this disclosure, the wording "housing" may be replaced by the wording "frame", and the wording "housing part" may be replaced by the wording "frame part".

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A debris blower comprising:
a housing,
a fan assembly arranged in the housing,
an outlet duct, and
at least one isolation element configured to reduce vibrations of the debris blower during operation,
wherein the fan assembly is suspended relative the housing completely via the at least one isolation element, and
wherein the at least one isolation element comprises a circumferential isolation element surrounding at least a portion of a circumference of the fan assembly.

2. The debris blower according to claim 1, wherein the fan assembly is suspended relative the outlet duct completely via the at least one isolation element.

3. The debris blower according to claim 2, wherein the outlet duct is rigidly attached to the housing.

4. The debris blower according to claim 1, wherein the fan assembly comprises a fan duct and a fan arranged in the fan duct, and wherein the at least one isolation element comprises at least one fan outlet isolation element extending between the fan duct and the outlet duct.

5. The debris blower according to claim 4, wherein an inner surface of the at least one fan outlet isolation element delimits a portion of an air flow path through the debris blower.

6. The debris blower according to claim 5, wherein the inner surface of the at least one fan outlet isolation element is flush with an inner surface of the fan duct at a transition area from the inner surface of the fan duct to the inner surface of the at least one fan outlet isolation element.

7. The debris blower according to claim 6, wherein the debris blower comprises an inlet duct, and wherein the fan assembly is suspended relative the inlet duct completely via the at least one isolation element.

8. The debris blower according to claim 7, wherein the inlet duct comprises an air inlet screen.

9. The debris blower according to claim 8, wherein the inlet duct is rigidly attached to the housing.

10. The debris blower according to claim 4, wherein at least a portion of the at least one fan outlet isolation element, the at least one of the fan inlet isolation element, or the circumferential isolation element is press fit between the housing and the fan assembly.

11. The debris blower according to claim 4, wherein the debris blower comprises one or more continuous pieces of isolation material each comprising at least a section of the circumferential isolation element, at least a section of the fan outlet isolation element, and at least a section of the fan inlet isolation element.

12. The debris blower according to claim 4, wherein the debris blower comprises one or more continuous pieces of isolation material each comprising at least a section of the fan outlet isolation element and at least a section of the outlet duct cladding.

13. The debris blower according to claim 4, wherein the debris blower comprises one or more continuous pieces of isolation material each comprising at least a section of the fan outlet isolation element, at least a section of fan inlet isolation element, at least a section of the circumferential isolation element, and at least a section of the outlet duct cladding.

14. The debris blower according to claim 13, wherein the one or more continuous pieces of isolation material together form a tubular structure, wherein an inner surface of the tubular structure comprises a first recess, and wherein the fan assembly is form-fittingly held in the first recess.

15. The debris blower according to claim 14, wherein an inner surface of the tubular structure comprises a second recess, and wherein at least a portion of the inlet duct is form-fittingly held in the second recess.

16. The debris blower according to claim 15, wherein the tubular structure comprises a third recess, and wherein at least a portion of the outlet duct is form-fittingly held in the third recess.

17. The debris blower according to claim 1, wherein the at least one isolation element comprises an outlet duct cladding covering inner surfaces of the outlet duct.

18. The debris blower according to any one of the preceding claim 1, wherein the at least one isolation element comprises foam rubber having a thickness within a range of 7 mm to 50 mm.

19. The debris blower according to claim 1, wherein the fan assembly comprises an axial fan and an electric motor configured to rotate the fan.

\* \* \* \* \*